United States Patent
Torvi (10) Patent No.: US 9,781,030 B1
(45) Date of Patent: Oct. 3, 2017

(54) FAST RE-ROUTE PROTECTION USING GRE OVER MPLS

(71) Applicant: Juniper Networks, Inc., Sunnyvale, CA (US)

(72) Inventor: Raveendra Torvi, Nashua, NH (US)

(73) Assignee: Juniper Networks, Inc., Sunnyvale, CA (US)

(*) Notice: Subject to any disclaimer, the term of this patent is extended or adjusted under 35 U.S.C. 154(b) by 241 days.

(21) Appl. No.: 14/675,386

(22) Filed: Mar. 31, 2015

(51) Int. Cl.
- H04L 12/28 (2006.01)
- H04L 12/707 (2013.01)
- H04L 12/703 (2013.01)
- H04L 12/723 (2013.01)
- H04L 12/947 (2013.01)
- H04L 12/24 (2006.01)

(52) U.S. Cl.
CPC .......... *H04L 45/22* (2013.01); *H04L 41/0668* (2013.01); *H04L 45/28* (2013.01); *H04L 45/50* (2013.01); *H04L 49/25* (2013.01)

(58) Field of Classification Search
CPC ......... H04L 45/50; H04L 45/22; H04L 45/04; H04L 45/28; H04L 45/00; H04L 41/12
See application file for complete search history.

(56) References Cited

U.S. PATENT DOCUMENTS

| | | | | |
|---|---|---|---|---|
| 6,973,057 B1* | 12/2005 | Forslow | ................... | H04L 45/50 370/328 |
| 7,801,021 B1* | 9/2010 | Triantafillis | ........ | H04L 12/4633 370/216 |
| 8,259,564 B1* | 9/2012 | Gredler | ............... | G06F 11/2005 370/218 |
| 2007/0189265 A1* | 8/2007 | Li | ........................ | H04L 41/0668 370/351 |
| 2011/0222412 A1* | 9/2011 | Kompella | ............... | H04L 45/00 370/241.1 |
| 2013/0259056 A1* | 10/2013 | Kotrabasappa | ......... | H04L 45/24 370/401 |

(Continued)

OTHER PUBLICATIONS

Rosen et al., "Multiprotocol Label Switching Architecture," RFC 3031, Network Working Group, The Internet Society, Jan. 2001, 60 pp.

(Continued)

*Primary Examiner* — Sai Aung
(74) *Attorney, Agent, or Firm* — Shumaker & Sieffert, P.A.

(57) ABSTRACT

Techniques are described for providing fast re-route (FRR) node and/or link protection along a primary label switched path (LSP) using generic routing encapsulation (GRE) over multi-protocol label switching (MPLS). An ingress edge router of a primary LSP is configured to encapsulate incoming packets into GRE with a destination address of an egress edge router of the primary LSP, and push a primary label onto the encapsulated packet for forwarding along the primary LSP. Upon a failover to a bypass LSP, a point of local repair (PLR) router swaps the primary label on the encapsulated packet with a bypass label. A merge point (MP) router then receives the encapsulated packet via the bypass LSP, and performs a lookup using the destination address of the egress edge router included on the encapsulated packet in order to determine a primary label for forwarding the encapsulated packet along the primary LSP.

15 Claims, 4 Drawing Sheets

(56) References Cited

U.S. PATENT DOCUMENTS

2013/0343174 A1* 12/2013 Guichard ............... H04L 45/22
370/218

OTHER PUBLICATIONS

Pan et al., "Fast Reroute Extensions to RSVP-TE for LSP Tunnels," RFC 4090, Network Working Group, The Internet Society, May 2005, 39 pp.

Andersson et al., "LDP Specification," RFC 5036, Network Working Group, The IETF Trust, Oct. 2007, 135 pp.

Farinacci et al. "Generic Routing Encapsulation (GRE)," RFC 2784, Network Working Group, The Internet Society, Mar. 2000, 9 pp.

* cited by examiner

FAST RE-ROUTE PROTECTION USING GRE OVER MPLS

TECHNICAL FIELD

The disclosure relates to computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as a Border Gateway Protocol (BGP) or an Interior Gateway Protocol (IGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by an IGP link-state routing protocol, such as an Intermediate System-Intermediate System (ISIS) protocol or an Open Shortest Path First (OSPF) protocol.

Head-end routers of an LSP are commonly known as ingress routers, while routers at the tail-end of the LSP are commonly known as egress routers. Intermediate or transit routers along the LSP that support MPLS are referred to generally as label switching routers (LSRs). A set of packets to be forwarded along the LSP is referred to as a forwarding equivalence class (FEC). A plurality of FECs may exist for each LSP, although there may, in some examples, be only one active LSP for any given FEC. Typically, a FEC definition includes the IP address of the destination of the LSP. In general, each router along the LSP maintains a context that associates a FEC with an incoming label and an outgoing label. The ingress router uses routing information, propagated from the egress router, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table based on the lookup and forwards the packet to the appropriate downstream LSR. The egress router removes the label from the packet and forwards the packet to its destination in accordance with non-label based packet forwarding techniques.

SUMMARY

In general, this disclosure describes techniques for providing fast re-route (FRR) node and/or link protection along a primary label switched path (LSP) using generic routing encapsulation (GRE) over multi-protocol label switching (MPLS). According to the disclosed techniques, an ingress edge router of a primary LSP is configured to encapsulate an incoming packet into GRE with a destination address of an egress edge router of the primary LSP, and push a primary label onto the encapsulated packet for forwarding along the primary LSP. Upon a FRR failover from the primary LSP to a bypass LSP, a point of local repair (PLR) router swaps the primary label on the encapsulated packet with a bypass label associated with the bypass LSP.

A merge point (MP) router may receive the encapsulated packet via the bypass LSP without a primary label used to lookup a nexthop for the encapsulated packet. According to the disclosed techniques, the MP router performs a lookup using the destination address of the egress edge router included on the encapsulated packet in order to determine a forwarding equivalent class (FEC) of the encapsulated packet, and then pushes a primary label for the determined FEC onto the encapsulated packet for further forwarding along the primary LSP. The disclosed techniques avoid the need for next nexthop (NNH) label distribution over targeted LDP sessions for FRR node protection. Avoiding NNH label distribution may reduce label state at both PLR routers and MP routers, and it may reduce or eliminate targeted LDP sessions between PLR routers and MP routers, which may improve scalability.

In one example, this disclosure is directed to a method comprising establishing, by a MP router, a bypass LSP between a PLR router and the MP router along a primary LSP established between an ingress edge router and an egress edge router; upon a failover from the primary LSP to the bypass LSP, receiving, by the MP router via the bypass LSP, a packet encapsulated with a GRE header and a delivery header including a destination address of the egress edge router of the primary LSP; determining, by the MP router, a FEC of the encapsulated packet based on the destination address of the egress edge router included in the delivery header of the encapsulated packet; pushing, by the MP router, a primary label for the determined FEC associated with the primary LSP onto the encapsulated packet; and forwarding the encapsulated packet along the primary LSP toward the egress edge router according to the primary label.

In another example, this disclosure is directed to a router configured to operate as a MP router, the router comprising a control unit comprising one or more processors configured to establish a bypass LSP between a PLR router and the MP router along a primary LSP established between an ingress edge router and an egress edge router, upon a failover from the primary LSP to the bypass LSP, receive, via the bypass LSP, a packet encapsulated with a GRE header and a delivery header including a destination address of the egress edge router of the primary LSP, determine a FEC of the encapsulated packet based on the destination address of the egress edge router included in the delivery header of the encapsulated packet, and push a primary label for the determined FEC associated with the primary LSP onto the encapsulated packet, The MP router further includes one or more packet interfaces configured to forward the encapsulated packet along the primary LSP toward the egress edge router according to the primary label.

In a further example, this disclosure is directed to a method comprising establishing, by a PLR router, a bypass LSP between a PLR router and a MP router along a primary LSP established between an ingress edge router and an egress edge router; receiving, by the PLR router, a packet encapsulated with a GRE header and a delivery header including a destination address of the egress edge router of the primary LSP, the encapsulated packet having a primary label associated with the primary LSP; upon a failover from the primary LSP to the bypass LSP, swapping, by the PLR router, the primary label of the encapsulated packet with a bypass label associated with the bypass LSP; and forwarding the encapsulated packet along the bypass LSP toward the MP router according to the bypass label.

In another example, this disclosure is directed to a router configured to operate as a PLR router, the router comprising a control unit comprising one or more processors configured to establish a bypass LSP between a PLR router and a MP router along a primary LSP established between an ingress edge router and an egress edge router, receive a packet encapsulated with a GRE header and a delivery header including a destination address of the egress edge router of the primary LSP, the encapsulated packet having a primary label associated with the primary LSP, and upon a failover from the primary LSP to the bypass LSP, swap the primary label of the encapsulated packet with a bypass label associated with the bypass LSP. The PLR router further includes one or more packet interfaces configured to forward the encapsulated packet along the bypass LSP toward the MP router according to the bypass label.

In an additional example, this disclosure is directed to a system comprising an ingress edge router of a primary LSP established between the ingress edge router and an egress edge router, the ingress edge router configured to encapsulate a packet with a GRE header and a delivery header including a destination address of the egress edge router, and push a first primary label associated with the primary LSP onto the encapsulated packet; a PLR router configured to establish a bypass LSP between the PLR router and a MP router along the primary LSP, receive the encapsulated packet having the first primary label, upon a failover from the primary LSP to the bypass LSP, swap the first primary label of the encapsulated packet with a bypass label associated with the bypass LSP, and forward the encapsulated packet having the bypass label along the bypass LSP toward the MP router; the MP router configured to, during the failover from the primary LSP to the bypass LSP, receive, via the bypass LSP, the encapsulated packet, determine a FEC of the encapsulated packet based on the destination address of the egress edge router included in the delivery header of the encapsulated packet, push a second primary label for the determined FEC associated with the primary LSP onto the encapsulated packet, and forward the encapsulated packet having the second primary label along the primary LSP toward the egress edge router; and the egress edge router of the primary LSP, the egress edge router configured to receive the encapsulated packet having the second primary label, remove the second primary label, the delivery header, and the GRE header from the packet, and forward the packet to a receiver.

The details of one or more examples are set forth in the accompanying drawings and the description below. Other features, objects, and advantages will be apparent from the description and drawings, and from the claims.

DETAILED DESCRIPTION

Figure 1:
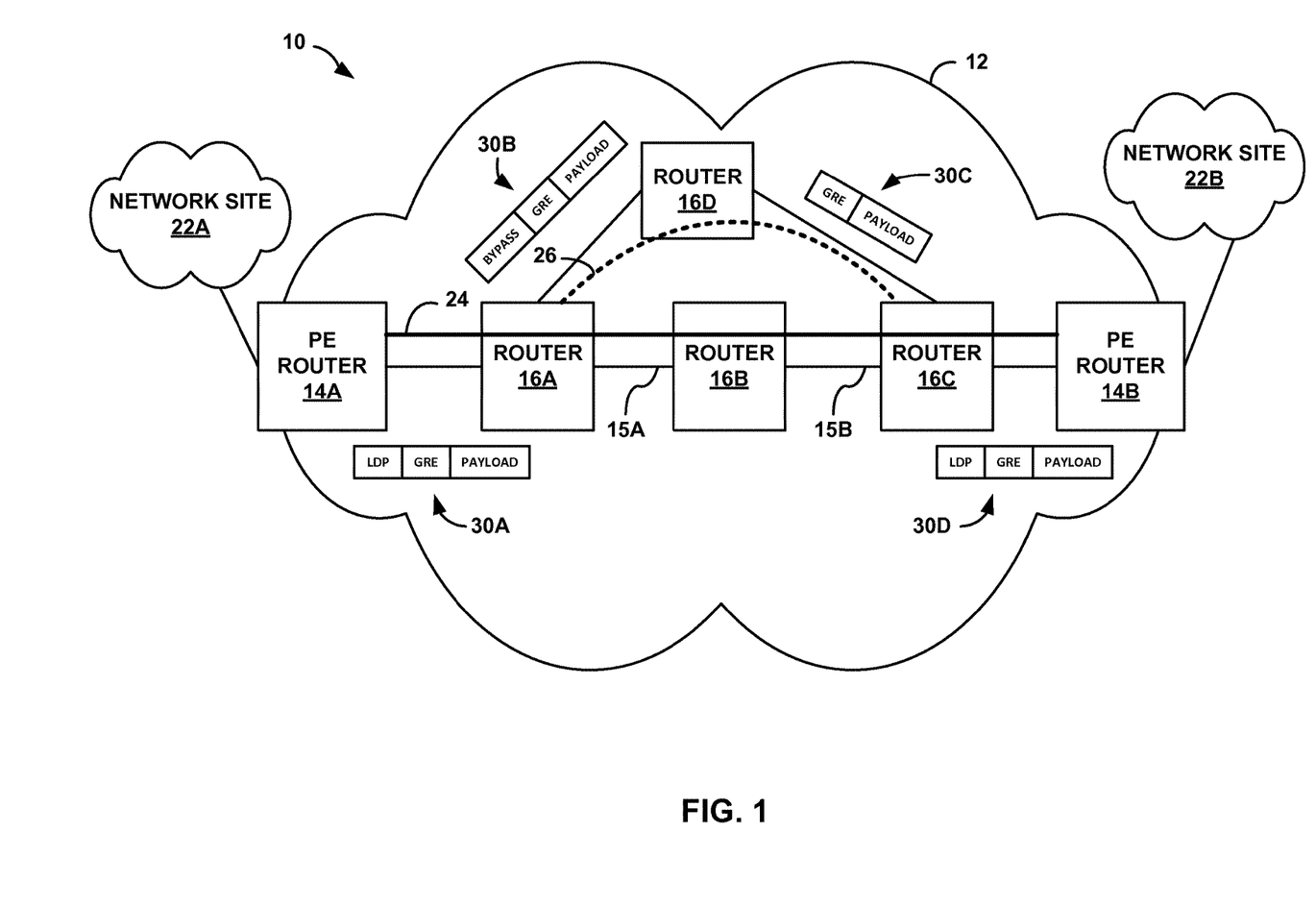
FIG. 1 is a block diagram illustrating an example system in which routers are configured to forward network traffic in accordance with the techniques of this disclosure.

FIG. 1 is a block diagram illustrating an example network system 10 in which provider edge (PE) routers 14A-14B ("PE routers 14") and transit routers 16A-16D ("transit routers 16") of network 12 are configured to forward network traffic (e.g., network packets) in accordance with the techniques of this disclosure. In the example of FIG. 1, PE router 14A is an ingress edge router of a primary label switched path (LSP) 24 and PE router 14B is an egress edge router of primary LSP 24. Transit routers 16A, 16B and 16C are intermediate routers along primary LSP 24 (represented as a solid line). Transit routers 16A, 16D and 16C are intermediate routers along bypass LSP 26 (represented as a dashed line).

In accordance with the techniques of this disclosure, transit router 16A operates as a point of local repair (PLR) router to establish bypass LSP 26 to provide fast re-route (FRR) node and/or link protection along primary LSP 24. For example, as illustrated in FIG. 1, PLR router 16A establishes bypass LSP 26 from PLR router 16A through transit router 16D, to transit router 16C on the other side of the protected node and/or links. Transit router 16C operates as a merge point (MP) router at which bypass LSP 26 merges back with primary LSP 24. In FIG. 1, PLR router 16A establishes bypass LSP 26 to provide FRR protection for transit router 16B and/or for links 15A and 15B between PLR router 16A and MP router 16C along primary LSP 24. In some cases, the FRR protection of bypass LSP 26 may be established by PLR router 16A in response to a request from ingress PE router 14A of primary LSP 24. In other cases, PLR router 16A may establish backup LSP 26 in response to a local configuration change by an administrator.

In some examples, network 12 may be a service provider network. For example, network 12 may represent one or more networks owned and operated by a service provider (which is commonly a private entity) that offer one or more services for consumption by customers or subscribers in network sites 22. In this context, network 12 is typically a layer three (L3) packet-switched network that provides L3 connectivity between a public network, such as the Internet, and one or more network sites 22. Often, this L3 connectivity provided by service provider network 12 is marketed as a data service or Internet service, and subscribers in network sites 22 may subscribe to this data service. Network 12 may represent a L3 packet-switched network that provides data, voice, television and any other type of service for purchase by subscribers and subsequent consumption by the subscribers in network sites 22.

Network sites 22 may be local area networks (LANs), wide area networks (WANs), or other private networks that include a plurality of subscriber devices (not shown). In some examples, network sites 22 may comprise distributed network sites of the same customer enterprise. In other examples, network sites 22 may belong to different entities. Subscriber devices within network sites 22 may include personal computers, laptops, workstations, personal digital assistants (PDAs), wireless devices, network-ready appliances, file servers, print servers or other devices capable of requesting and receiving data via network 12. While not shown in the example of FIG. 1, network system 10 may include additional service provider networks, subscriber networks and other types of networks, such as access networks, private networks, or any other type of network.

Routers 14 and 16 in network 12 represent any network devices that route or otherwise forward traffic through network 12. Typically, routers 14 and 16 represent layer 3 (L3) packet-switching devices that operate at L3 to exchange routing information that describes a current topology of network 12 using a routing protocol, such as an Interior Gateway Protocol (IGP) or a Border Gateway Protocol (BGP). Routers 14 and 16 then process this routing information, selecting paths through its representation of the topology of network 12 to reach all available destinations to generate forwarding information. In other words, routers 14 and 16 reduce these paths to so-called "nexthops" that identify interfaces to which to forward packets destined for a particular destination, where the forwarding information includes this list of next hops. Routers 14 and 16 then install this forwarding information in a forwarding plane of the router, whereupon the forwarding plane forwards received traffic in accordance with the forwarding information.

Network 12 may comprise an Internet Protocol (IP) network that uses Multi-Protocol Label Switching (MPLS) protocols to engineer traffic patterns over an MPLS core of the IP network. By utilizing MPLS, PE routers 14 can request distinct paths, i.e., label switched paths (LSPs), through network 12 to carry packets between customers or subscribers in remote network sites 22A-22B ("network sites 22"). A short label associated with a particular LSP, e.g., primary LSP 24, is affixed to the packets that travel through network 12 via primary LSP 24. Transit routers 16 along the path cooperatively perform MPLS operations to forward the packets along the established primary LSP 24.

A variety of protocols exist for establishing LSPs, e.g., the Label Distribution Protocol (LDP) and the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System-Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generally as label switching routers (LSRs). In the example of FIG. 1, transit routers 16A are LSRs, PE router 14A is the ingress edge router to primary LSP 24, and PE router 14B is the egress edge router to primary LSP 24. A set of packets to be forwarded along the LSP is referred to as a forwarding equivalence class (FEC). In general, each router along the LSP maintains a context that associates a FEC with an incoming label and an outgoing label. This association is referred to as a FEC-label binding. The ingress label edge router (LER) uses routing information, propagated from the egress LER, to determine the LSP, assign labels for the LSP, and affix a label to each packet of the FEC.

The LSRs use MPLS protocols to receive MPLS label mappings from downstream LSRs and to advertise MPLS label mappings to upstream LSRs. Using MPLS mechanisms, data packets are assigned labels to identify the FEC to which the packets belong, and forwarding decisions are made for the data packets based on the labels. The labels are included in MPLS headers used to encapsulate the packets for transport along the LSP. In some examples, the labels are "stacked" to establish segmented LSP tunnels in which multiple LSPs are nested together in order to reach an egress router of the last LSP on the label stack. When an LSR receives an MPLS packet from an upstream router, the LSR performs a lookup in the context and swaps the MPLS label(s) according to the information in its forwarding table based on the lookup and forwards the packet to the appropriate downstream LSR or LER. The egress LER (or in some cases, the penultimate router on the LSP) removes the label(s) from the packet and the egress LSR forwards the packet to its destination in accordance with non-label based packet forwarding techniques.

In some examples, PE routers 14 and transit routers 16 may establish primary LSP 24 using LDP. The LSRs may use LDP to distribute labels to other routers along hop-by-hop paths to establish LSPs. More specifically, the routers may distribute LDP label mapping messages indicating assigned labels and associated FECs for the LSPs. Two routers that use LDP to exchange label mapping information are referred to as LDP peer routers. Directly connected neighbor routers may be LDP peer routers with a direct LDP session. In the case where non-neighbor routers (i.e., routers that are not directly connected at the link level but which are reachable at the network level) want to be LDP peer routers, the non-neighbor routers may use the LDP extended discovery mechanism and establish a targeted LDP session. More information on LDP and targeted LDP sessions is described in Anderson, L., "LDP Specification," RFC 5036, October 2007, the entire contents of which are incorporated by reference herein. More information on MPLS is described in Rosen, E., "Multiprotocol Label Switching Architecture," RFC 3031, January 2001, the entire contents of which are incorporated by reference herein.

When an LSP such as primary LSP 24 is established, LSRs along the LSP may also establish one or more bypass LSPs to provide fast re-route (FRR) link and/or node protection for the LSP. Router 16A is a point of local repair (PLR) router along the path of primary LSP 24. In the example of FIG. 1, PLR router 16A is a transit router, i.e., an intermediate router along primary LSP 24 and is neither an ingress router nor an egress router of primary LSP 24. In other examples, PLR router 16A may be both the PLR and the ingress router of an LSP. Router 16C is the merge point (MP) for bypass LSP 26. Bypass LSP 26 is an LSP that provides node protection for protected router 16B and/or link protection for protected links 15A and 15B between PLR router 16A and MP router 16C along primary LSP 24, such that if protected router 16B or protected links 15A or 15B should become unresponsive, PLR router 16A send the network traffic received on primary LSP 24 through the bypass LSP 26. Bypass LSP 26 follows a path from PLR router 16A to transit router 16D to MP router 16C, avoiding the protected resources (in this case, protected router 16B and/or protected links 15A and 15B).

When PLR router 16A detects that protected router 16B is unresponsive, PLR router 16A begins forwarding network traffic received from PE router 14A on primary LSP 24 on to bypass LSP 26. MP router 16C receives the network traffic on bypass LSP 26 from router 16D and forwards the traffic on the path of primary LSP 24 to PE router 14B. In some examples, PLR router 16A may have previously computed and signaled bypass LSP 26 as a backup path for protected router 16B and/or protected links 15A and 15B using the Resource Reservation Protocol with Traffic Engineering extensions (RSVP-TE), prior to detecting any failure of protected router 16B and/or protected links 15A and 15B. MPLS fast re-route (FRR) techniques are described in more detail in P. Pan, "Fast Reroute Extensions to RSVP-TE for LSP Tunnels," Network Working Group RFC 4090, May 2005, the entire contents of which are incorporated by reference herein.

In some examples, PLR router 16A may establish bypass LSP 26 upon receiving, from ingress PE router 14A of primary LSP 24, a request for node and/or link protection. In other examples, PLR router 16A may establish backup LSP 26 in response to a local configuration change by an administrator. After PLR router 16A establishes bypass LSP 26, PLR router 16A maintains forwarding information in a forwarding plane of PLR router 16A that allows PLR router 16A to send traffic through bypass LSP 26 if protected router 16B and/or protected links 15A or 15B fail. Upon a node and/or link failure, PLR router 16A redirects traffic over bypass LSP 26 from PLR router 16A to MP router 16C.

Conventional FRR techniques require a PLR router to either know or to learn a MPLS label associated with a MP router such that, upon receiving traffic over a bypass LSP between the PLR router and the MP router, the MP router is able to use the MPLS label to forward the traffic along the primary LSP. For example, the PLR router may tunnel the traffic of the primary LSP over the bypass LSP using a label stack that includes both primary labels, e.g., LDP labels associated with the primary LSP, and bypass labels, e.g., RSVP labels associated with bypass LSP. The outside bypass labels are popped off as the traffic traverses the bypass LSP, and the MP router uses the inside primary labels to forward the traffic along the primary LSP.

In the case of node protection, the MP router may be the next nexthop (NNH) of the PLR router along the primary LSP. In order for the PLR router to learn the MPLS label for the MP router, the PLR router and the MP router may establish a targeted LDP session to exchange NNH label mapping messages. In this case, the PLR router may first swap an incoming primary label with the NNH label, and then push a bypass label onto the traffic. The outside bypass labels are popped off as the traffic traverses the bypass LSP, and the MP router uses the inside NNH label to forward the traffic along the primary LSP.

The techniques of this disclosure provide FRR node and/or link protection without the need for next nexthop (NNH) label distribution and establishment of many targeted LDP sessions to exchange the NNH label mapping messages. In addition, the techniques of this disclosure provide FRR node and/or link protection without the need for the PLR router to tunnel the traffic of the primary LSP over the bypass LSP using a label stack. Instead, the techniques of this disclosure enable the PLR router to perform a local swap of an incoming primary label with an outgoing bypass label to forward the traffic over the bypass LSP.

In general, this disclosure describes techniques for providing FRR node and/or link protection using generic routing encapsulation (GRE) over multi-protocol label switching (MPLS). The GRE protocol provides encapsulation of an arbitrary network layer protocol over another arbitrary network layer protocol. For example, in a system where a packet needs to be encapsulated and delivered to some destination, the payload packet may first be encapsulated in a GRE packet, and the resulting GRE packet can then be encapsulated in some other protocol, called the delivery protocol, and forwarded. The GRE protocol is described in more detail in D. Farinacci, "Generic Routing Encapsulation (GRE)," Network Working Group RFC 2784, March 2000, the entire contents of which are incorporated by reference herein.

According to the disclosed techniques, in the example illustrated in FIG. 1, ingress PE router 14A may be configured to encapsulate an incoming packet received from a subscriber device in network site 22A into GRE with a GRE header and a delivery header that includes a destination address of egress PE router 14B of primary LSP 24. In some examples, the delivery protocol may be the Internet Protocol (IP) such that the destination address of egress PE router 14B included in the delivery header is an IP address. Ingress PE router 14 then adds an MPLS header that includes a primary label onto the encapsulated packet for forwarding along primary LSP 24, resulting in encapsulated packet 30A. In one example, the primary label may be an LDP label associated with primary LSP 24.

PLR router 16A receives encapsulated packet 30A over primary LSP 24 and either forwards the encapsulated packet further along primary LSP 24 or, in the case of a FRR failover from primary LSP 24 to bypass LSP 26, forwards the encapsulated packet along bypass LSP 26. For example, a forwarding plane of PLR router 16A may be programmed with two nexthops associated with the FEC of the encapsulated packet, a primary nexthop along primary LSP 26 and a backup nexthop along bypass LSP 26. According to the disclosed techniques, in the case of a failover to bypass LSP 26, PLR router 16A swaps the primary label, e.g, the LDP label, on encapsulated packet 30A with a bypass label associated with the bypass LSP, resulting in encapsulated packet 30B. In one example, the bypass label may be a RSVP label associated with bypass LSP 26.

Encapsulated packet 30B traverses bypass LSP 26 to transit router 16D. Transit router 16D, as the penultimate router of bypass LSP 26, pops off or removes the bypass label from the encapsulated packet, resulting in encapsulated packet 30C. In some examples, transit router 16D may remove the bypass label and send GRE encapsulated with packet 30C, as illustrated in FIG. 1. In other examples, transit router 16D may swap the bypass label on the encapsulated packet with an explicit-null bypass label in order to maintain an MPLS header on the encapsulated packet. In either case, transit router 16D sends an encapsulated packet to MP router 16C without a label associated with primary LSP 24. MP router 16C, therefore, does not receive a label that can be used to directly lookup a nexthop along primary LSP 24 for the encapsulated packet.

In accordance with the techniques of this disclosure, upon receiving encapsulated packet 30C via bypass LSP 26, MP router 16C performs a lookup of the MP router using the destination address of egress PE router 14B included in the delivery header of the GRE encapsulated packet 30C. Based on the destination address, MP router 16C is able to determine a FEC of the encapsulated packet and an associated nexthop and label mapping for the determined FEC. In the case where the received encapsulated packet includes the explicit-null bypass label, MP router 16C first pops off or removes the explicit-null bypass label from the encapsulated packet. MP router 16C then pushes a primary label for the determined FEC onto the encapsulated packet, resulting in encapsulated packet 30D, for further forwarding along primary LSP 24 toward egress PE router 14B. In one example, the primary label may be an LDP label associated with primary LSP 24.

Furthermore, according to the disclosed techniques, egress PE router 14B of primary LSP 24 is configured to receive encapsulated packet 30D via primary LSP 24 and remove the MPLS header including the primary label, and the GRE header and the delivery header including the destination address of egress PE router 14B from the packet. Egress PE router 14B then forwards the packet downstream to a receiver, e.g., a subscriber device in network site 22B, in accordance with non-label based packet forwarding techniques.

By encapsulating the packets into GRE with the destination address of the egress edge router of the primary LSP, the techniques of this disclosure enable a PLR router to perform a local swap of a MPLS primary label with a bypass label for the encapsulated packet. In addition, by encapsulating the packets into GRE with the destination address of the egress edge router of the primary LSP, the techniques of this disclosure enable a MP router to determine the FEC of the encapsulated packet received over the bypass LSP and, based on the determined FEC, determine the nexthop for the encapsulated packet along the primary LSP, without the need for tunneled or nested MPLS labels associated with the primary LSP.

According to the disclosed techniques, routers may avoid tunneling traffic over a bypass LSP using a label stack that includes both primary labels and bypass labels. Furthermore, according to the disclosed techniques, routers may avoid NNH label distribution over targeted LDP sessions and avoid using NNH primary labels to transmit traffic over the bypass LSP. Avoiding NNH label distribution may reduce label state at both PLR routers and MP routers, and it may reduce or eliminate targeted LDP sessions between PLR routers and MP routers, which may improve scalability. For example, without NNH label distribution, a PLR router does not need to maintain NNH label state for each non-neighbor LDP peer router.

The techniques of this disclosure do not require any changes to existing protocols or standards or the existing mechanisms of FRR node and/or link protection. The disclosed techniques require GRE encapsulation between ingress and egress edge routers of a primary LSP, and forwarding plane changes at PLR and MP routers for label operations during FRR operations. In the case of LDP, every router along the primary LSP may be both a transit router and an ingress router. In this way, no control plane changes are needed at MP routers to perform the FEC lookup based on the IP destination address of the egress edge router of the primary LSP. The techniques do not create any additional control plane state at MP routers. The techniques work with MPLS and IP, and any type of service traffic as long as IGP is used as the routing protocol. Further, while the techniques are primary described above with respect to unicast services from an ingress PE to an egress PE, the techniques of this disclosure may also be applied to multicast services from an ingress PE to two or more egress PEs.

Figure 2:
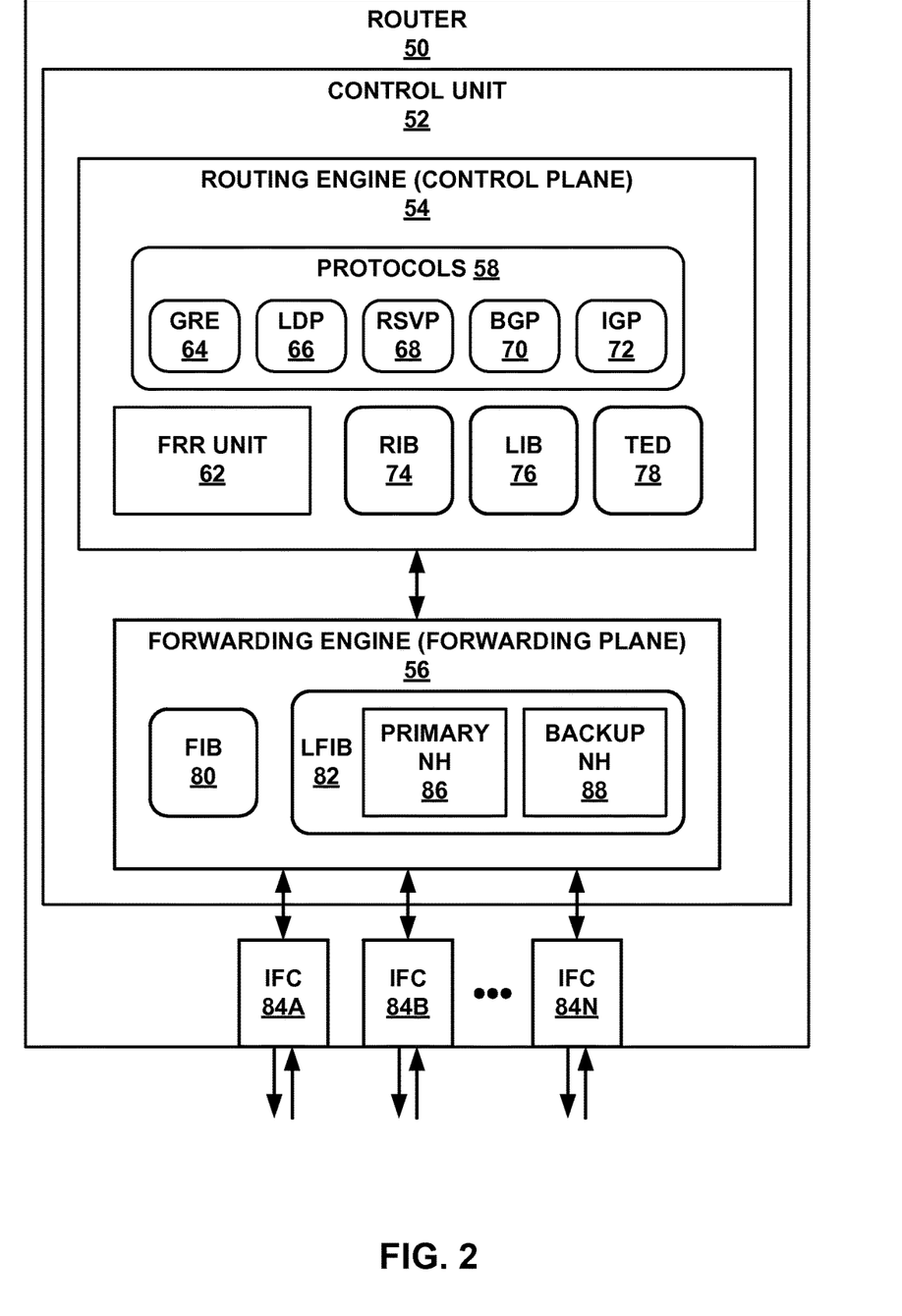
FIG. 2 is a block diagram illustrating an example of a router configured to performing the disclosed techniques of fast re-route (FRR) protection using generic routing encapsulation (GRE) over multi-protocol label switching (MPLS).

FIG. 2 is a block diagram illustrating an example router 50 configured to perform the disclosed techniques of FRR protection using GRE over MPLS. Router 50 may operate as either PLR router 16A or MP router 16C from FIG. 1. In the illustrated example of FIG. 2, router 50 includes a control unit 52 with a routing engine 54 that provides control plane functionality for the router and a forwarding engine 56 that provides forwarding or data plane functionality for the router to send and receive traffic by a set of packet interface cards 84A-84N ("IFCs 84") that typically have one or more physical network interface ports. Control unit 52 may include one or more daemons (not shown) that comprise user-level processes that run network management software, execute routing protocols to communicate with peer routers or switches, maintain and update one or more routing tables in routing engine 54, and create one or more forwarding tables for installation in forwarding engine 56, among other functions.

Forwarding engine 56 performs packet switching and forwarding of incoming data packets for transmission over a network. As shown in FIG. 2, forwarding engine 56 includes a forwarding information base (FIB) 80 that stores forwarding data structures associating network destinations with nexthops and outgoing interfaces. Forwarding engine 56 also includes a label FIB (LFIB) 82 that stores label routes associating an incoming label for a given LSP with an outgoing label and a nexthop router. Although not shown in FIG. 2, forwarding engine 56 may comprise a central processing unit (CPU), memory and one or more programmable packet-forwarding application-specific integrated circuits (ASICs).

Routing engine 54 includes various protocols 58 that perform routing functions for router 50. In the illustrated example of FIG. 2, routing engine 54 includes BGP 70 and IGP 72 as routing protocols used to exchange routing information with other routing devices in a network in order to discover the network topology and update a routing information base (RIB) 74. In the examples described in this disclosure, IGP 72 may be a link-state routing protocol such as open shortest path first (OSPF) or intermediate system-*intermedia* system (IS-IS). In addition, routing engine 54 includes RSVP 68, and specifically RSVP-TE, as a routing protocol used to establish traffic engineered paths, i.e., LSPs, with the other network devices in the network using RIB 74. Routing engine 54 uses RSVP 68 to exchange label mapping messages with other routing devices along the LSPs and update a label information base (LIB) 76.

RIB 74 may describe the topology of the network in which router 50 resides, and may also describe various routes within the network and the appropriate nexthops for each route, i.e., the neighboring routing devices along each of the routes. Routing engine 54 analyzes the information stored in RIB 74 to generate forwarding information. Routing engine 54 then installs forwarding data structures into FIB 80 within forwarding engine 56. FIB 80 associates network destinations with specific nexthops and corresponding interface ports within the forwarding plane. LIB 76 maintains mappings of nexthop labels to the nexthops for each route within the network from RIB 74. Routing engine 54 selects specific paths through the network and installs the nexthop label mappings for the nexthops along those specific paths in LFIB 82 within forwarding engine 56.

In some examples, routing engine 54 uses RSVP 68 to generate and maintain a traffic engineering database (TED) 78 including a complete list of nodes and links in the network that are participating in traffic engineering and a set of attributes for each of the links. For example, TED 78 may include bandwidth reservations for links associated with LSPs through the network. Routing engine 54 may use IGP 72 to advertise the traffic engineering attributes stored in TED 78 to other routing devices in the network. Routing engine 54 may also receive IGP advertisements including traffic engineering attributes from the other routing devices in the network and update TED 78.

According to the techniques described in this disclosure, router 50 is configured to provide FRR node and/or link protection using GRE over MPLS, without performing NNH label distribution. In the case where router 50 operates as an ingress edge router of a primary LSP between the ingress edge router and an egress edge router, routing engine 54 uses GRE 64 to encapsulate an incoming packet with a GRE header and a delivery header including a destination address of the egress edge router of the primary LSP. Routing engine 54 of ingress edge router 50 may then determine a primary label for a FEC of the encapsulated packet associated with the primary LSP from LIB 76, and push the primary label onto the encapsulated packet. Forwarding engine 56 then forwards the encapsulated packet having the primary label along the primary LSP toward the egress edge router.

In the case where router 50 operates as a PLR router configured to provide FRR node and/or link protection, routing engine 54 uses FRR unit 62 to establish a bypass LSP with a MP router along the primary LSP. More specifically, FRR unit 62 may establish the bypass LSP using either LDP 66 or RSVP 68. Routing engine 54 may then install a backup nexthop for the newly established bypass LSP in LFIB 82 within forwarding engine 56. As illustrated in FIG. 2, LFIB 82 includes a primary nexthop (NH) 86 for the primary LSP and a backup NH 88 for the bypass LSP.

In accordance with the disclosed techniques, forwarding engine 56 of PLR router 50 may receive, via IFCs 84, a packet encapsulated into GRE with a GRE header and a delivery header including a destination address of the egress edge router of the primary LSP, and having a first primary label associated with the primary LSP. Prior to a failover from the primary LSP to the bypass LSP, forwarding engine 56 performs a lookup in LFIB 82 based on the first primary label to determine primary nexthop 86 having a swap primary label operation. In accordance with the swap primary label operation of primary nexthop 86, forwarding engine 56 swaps the first primary label on the encapsulated packet with a second primary label associated with the primary LSP. Forwarding engine 56 then forwards the encapsulated packet having the second primary label along the primary LSP toward the egress edge router.

After a failover from the primary LSP to the bypass LSP, forwarding engine 56 performs a lookup in LFIB 82 based on the first primary label to determine backup nexthop 88 having a swap bypass label operation. In accordance with the swap bypass label operation of backup nexthop 88, forwarding engine 56 swaps the first primary label on the encapsulated packet with a bypass label associated with the bypass LSP. Forwarding engine 56 then forwards the encapsulated packet having the bypass label along the bypass LSP toward the MP router.

In the case where router 50 operates as a MP router, after the failover from the primary LSP to the bypass LSP, forwarding engine 56 of MP router 50 may receive, via IFCs 84 over the bypass LSP, a packet encapsulated into GRE with a GRE header and a delivery header including a destination address of the egress edge router of the primary LSP. In some examples, the received encapsulated packet may merely by the GRE encapsulated packet without any MPLS labels. In other examples, in order to maintain MPLS forwarding all along the primary LSP, the received encapsulated packet may include an explicit-null bypass label. In either case, forwarding engine 56 receives an encapsulated packet without any labels associated with the primary LSP. Forwarding engine 56, therefore, cannot directly lookup the nexthop along the primary LSP for the encapsulated packet in LFIB 82.

In accordance with the disclosed techniques, control unit 52 of MP router 50 performs a lookup using the destination address of the egress edge router included in the delivery header of the GRE encapsulated packet to determine the FEC of the encapsulated packet and an associated nexthop and label mapping for the FEC. In one example, forwarding engine 56 may perform the lookup in FIB 80. In the case where the received encapsulated packet includes the explicit-null bypass label, forwarding engine 56 may first pop off or remove the explicit-null bypass label from the encapsulated packet. Forwarding engine 56 may then perform the lookup in FIB 80 to determine the nexthop for the destination address of the egress edge router of the primary LSP. For example, forwarding engine 56 may determine a primary nexthop from FIB 80, and push a second primary label associated with the primary LSP onto the encapsulated packet. Forwarding engine 56 then forwards the encapsulated packet having the second primary label along the primary LSP toward the egress edge router.

In another example, forwarding engine 56 may send the received encapsulated packet to routing engine 54 for control plane processing. In the case where the received encapsulated packet includes the explicit-null bypass label, forwarding engine 56 may first pop off or remove the explicit-null bypass label from the encapsulated packet. Routing engine 54 may then perform the lookup in LIB 76 to determine the nexthop and the associated label for the destination address of the egress edge router of the primary LSP. For example, routing engine 54 may determine a primary nexthop having an associated second primary label from LIB 76, and push the second primary label onto the encapsulated packet. Forwarding engine 56 then forwards the encapsulated packet having the second primary label along the primary LSP toward the egress edge router.

Figure 3:
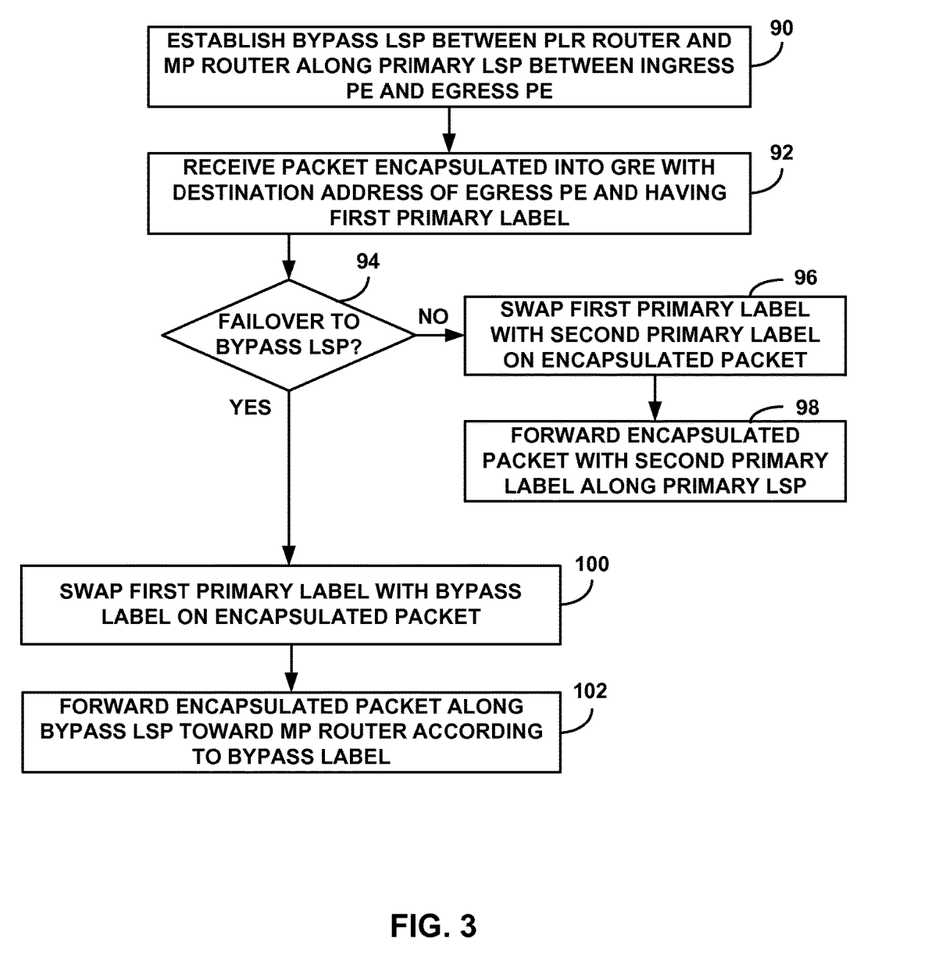
FIG. 3 is a flowchart illustrating an example operation of a point of local repair (PLR) router providing FRR protection using GRE over MPLS, in accordance with techniques of this disclosure.

FIG. 3 is a flowchart illustrating an example operation of a point of local repair (PLR) router providing FRR protection using GRE over MPLS, in accordance with techniques of this disclosure. The example operation of FIG. 3 is described with respect to router 50 from FIG. 2 when operating as a PLR router. In some examples, the operation illustrated by FIG. 3 may be performed by router 16A from FIG. 1.

PLR router 50 establishes a bypass LSP with a MP router, e.g., bypass LSP 26 between PLR router 16A and MP router 16C from FIG. 1, along a primary LSP established between an ingress edge router and an egress edge router, e.g., primary LSP 24 between ingress PE router 14A and egress PE router 14B from FIG. 1 (90). More specifically, routing engine 54 of PLR router 50 may establish the bypass LSP using either LDP 66 or RSVP 68. In some cases, PLR router 50 may establish the bypass LSP to provide FRR protection for nodes and/or links along the primary LSP, e.g., bypass LSP 26 from FIG. 1 provides FRR protection for router 16B and/or for links 15A and 15B between PLR router 16A and MP router 16C along primary LSP 24. In some cases, PLR router 50 may receive a request to provide the FRR protection from the ingress edge router of the primary LSP or from an administrator.

According to the techniques of this disclosure, the ingress edge router of the primary LSP is configured to use GRE to encapsulate an incoming packet with a destination address of the egress edge router of the primary LSP prior to pushing a MPLS label onto the encapsulated packet for transmission through the network via the primary LSP. PLR router 50, therefore, receives a packet encapsulated into GRE with a GRE header and a delivery header including the destination address of the egress edge router of the primary LSP and having a first primary label associated with the primary LSP (92). The first primary label may comprise a LDP label used by PLR router 50 to identify incoming packets of a given FEC associated with the primary LSP.

Upon detecting a failure at a protected node and/or a protected link along the primary LSP, PLR router 50 is configured to perform FRR techniques in order to failover or re-direct traffic to the previously established bypass LSP (94). Prior to a failover to the bypass LSP (NO branch of 94), upon receiving the encapsulated packet having the first primary label, PLR router 50 swaps the first primary label of the encapsulated packet with a second primary label associated with the primary LSP (96). The second primary label may comprise a LDP label used by PLR router 50 to identify outgoing packets of the given FEC associated with the primary LSP. For example, forwarding engine 56 of PLR router 50 may perform a lookup in LFIB 82 based on the first primary label to determine primary nexthop 86 having a swap primary label operation. In accordance with the swap primary label operation of primary nexthop 86, forwarding engine 56 of PLR router 50 removes the first primary label from the encapsulated packet and adds the second primary label onto the encapsulated packet. PLR router 50 then forwards the encapsulated packet along the primary LSP toward the egress edge router according to the second primary label (98).

When a failover to the bypass LSP occurs (YES branch of 94), upon receiving the encapsulated packet having the first primary label, PLR router 50 swaps the primary label of the encapsulated packet with a bypass label associated with the bypass LSP (100). The bypass label may comprise either a LDP label or a RSVP label used by PLR router 50 to identify outgoing packets of the given FEC associated with the bypass LSP. For example, after the failover, forwarding engine 56 of PLR router 50 may perform a lookup in LFIB 82 based on the first primary label to determine backup nexthop 88 having a swap bypass label operation. In accordance with the swap bypass label operation of backup nexthop 88, forwarding engine 56 of PLR router 50 removes the first primary label from the encapsulated packet and adds the bypass label onto the encapsulated packet. PLR router 50 then forwards the encapsulated packet along the bypass LSP toward the MP router according to the bypass label (102).

Figure 4:
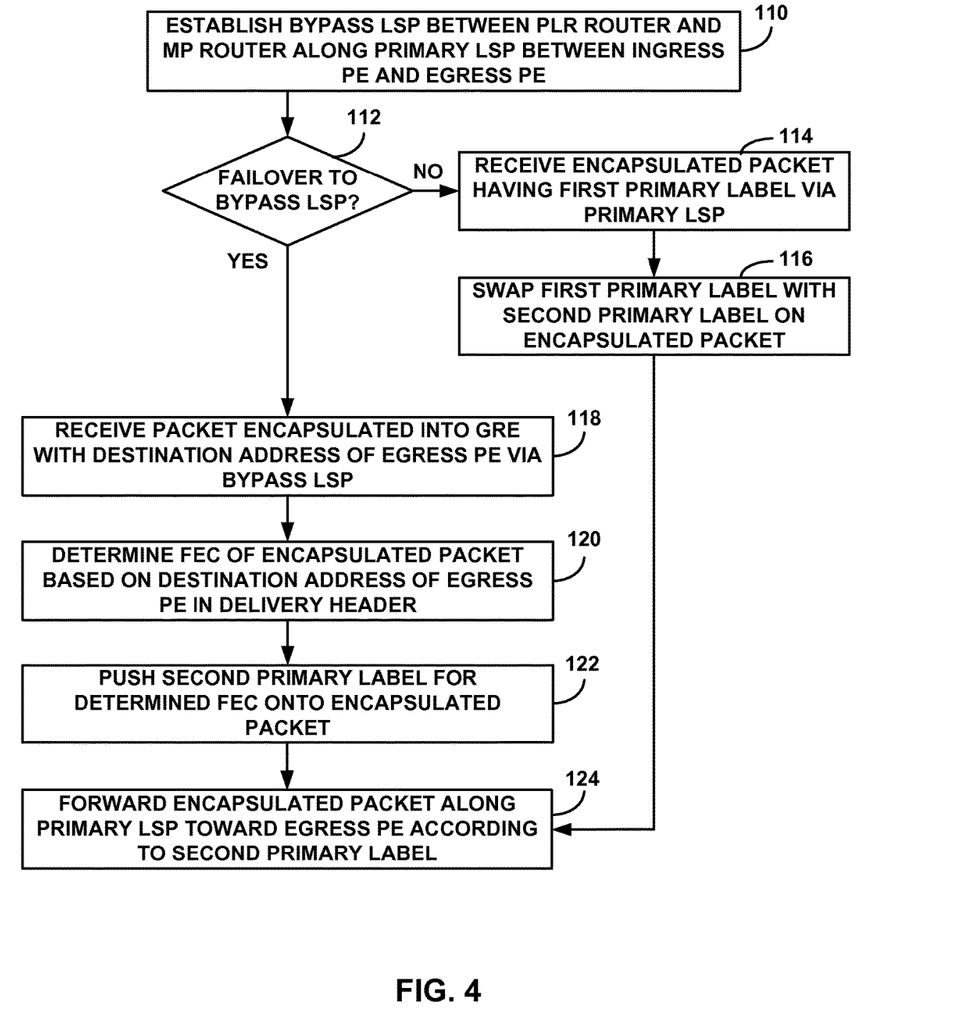
FIG. 4 is a flowchart illustrating an example operation of a merge point (MP) router providing FRR protection using GRE over MPLS, in accordance with techniques of this disclosure.

FIG. 4 is a flowchart illustrating an example operation of a merge point (MP) router providing FRR protection using GRE over MPLS, in accordance with techniques of this disclosure. The example operation of FIG. 4 is described with respect to router 50 from FIG. 2 when operating as a MP router. In some examples, the operation illustrated by FIG. 4 may be performed by router 16C from FIG. 1.

MP router 50 establishes a bypass LSP with a PLR router, e.g., bypass LSP 26 between PLR router 16A and MP router 16C from FIG. 1, along a primary LSP established between an ingress edge router and an egress edge router, e.g., primary LSP 24 between ingress PE router 14A and egress PE router 14B from FIG. 1 (110). More specifically, routing engine 54 of MP router 50 may establish the bypass LSP using either LDP 66 or RSVP 68. In some cases, the PLR router may initiate establishment of the bypass LSP with MP router 50 to provide FRR protection for intermediate nodes and/or links along the primary LSP, e.g., bypass LSP 26 from FIG. 1 provides FRR protection for router 16B and/or for links 15A and 15B between PLR router 16A and MP router 16C along primary LSP 24.

According to the techniques of this disclosure, the ingress edge router of the primary LSP is configured to use GRE to encapsulate an incoming packet with a destination address of the egress edge router of the primary LSP prior to pushing a MPLS label onto the encapsulated packet for transmission through the network via the primary LSP. Furthermore, as described above with respect to FIG. 3, the PLR router receives a packet encapsulated into GRE with a GRE header and a delivery header including the destination address of the egress edge router of the primary LSP and having a MPLS label associated with the primary LSP. The PLR router then forwards the encapsulated packet with another MPLS label toward the egress edge router of the primary LSP via either the primary LSP or, in the case of a failure at a protected node and/or protected link along the primary LSP, the previously established bypass LSP.

Prior to a failover to the bypass LSP (NO branch of 112), MP router 50 receives, via the primary LSP, a packet encapsulated into GRE with a GRE header and a delivery header including the destination address of the egress edge router of the primary LSP and having a first primary label associated with the primary LSP (114). The first primary label may comprise a LDP label used by MP router 50 to identify incoming packets of a given FEC associated with the primary LSP. MP router 50 swaps the first primary label of the encapsulated packet with a second primary label associated with the primary LSP (116). The second primary label may comprise a LDP label used by MP router 50 to identify outgoing packets of the given FEC associated with the primary LSP. For example, forwarding engine 56 of MP router 50 may perform a lookup in LFIB 82 based on the first primary label to determine a primary nexthop having a swap primary label operation. In accordance with the swap primary label operation of the primary nexthop, forwarding engine 56 of MP router 50 removes the first primary label from the encapsulated packet and adds the second primary label onto the encapsulated packet. MP router 50 then forwards the encapsulated packet along the primary LSP toward the egress edge router according to the second primary label (124).

When a failover to the bypass LSP occurs (YES branch of 112), MP router 50 receives, via the bypass LSP, a packet encapsulated into GRE with a GRE header and a delivery header including the destination address of the egress edge router of the primary LSP (118). In some examples, the received encapsulated packet may merely include the GRE encapsulated packet without any MPLS labels. In other examples, in order to maintain MPLS forwarding all along the primary LSP, the received encapsulated packet may include an explicit-null bypass label. The explicit-null bypass label may comprise either a LDP explicit-null label or a RSVP explicit-null label. In either case, the received encapsulated packet does not include a label associated with the primary LSP that can be used by forwarding engine 56 of MP router 50 to lookup the nexthop along the primary LSP for the encapsulated packet in LFIB 82.

In accordance with the disclosed techniques, MP router 50 determines a FEC of the encapsulated packet based on the destination address of the egress edge router included in the delivery header of the GRE encapsulated packet (120). In the case where the received encapsulated packet includes the explicit-null bypass label, forwarding engine 56 of MP router 50 first pops off or removes the explicit-null bypass label from the encapsulated packet. In some examples, forwarding engine 56 of MP router 50 may then perform a lookup in FIB 80 using the destination address included in the delivery header to determine the FEC of the encapsulated packet and an associated nexthop and label mapping for the FEC. In other examples, forwarding engine 56 may send the encapsulated packet to routing engine 54 of MP router 50, and routing engine 54 may then perform a lookup in LIB 76 using the destination address included in the delivery header to determine the FEC of the encapsulated packet and an associated nexthop and label mapping for the FEC.

MP router 50 then pushes a second primary label for the determined FEC associated with the primary LSP onto the encapsulated packet (122). For example, forwarding engine 56 or routing engine 54 of MP router 50 may determine a primary nexthop having a primary label operation based on the determined FEC. In accordance with the primary label operation of the primary nexthop, forwarding engine 56 of MP router 50 adds the second primary label onto the encapsulated packet. MP router 50 then forwards the encapsulated packet along the primary LSP toward the egress edge router according to the second primary label (124). According to the techniques of this disclosure, the egress edge router of the primary LSP is configured to receive the encapsulated packet having the second primary label via the primary LSP, remove the second primary label and the GRE header and the delivery header from the packet, and forward the packet downstream to a receiver.

By encapsulating the packets into GRE with a GRE header and delivery header that includes the destination address of the egress edge router of the primary LSP, the techniques of this disclosure enable a PLR router to perform a local swap of a MPLS primary label with a bypass label for the encapsulated packet. In addition, by encapsulating the packets into GRE with a GRE header and a delivery header that includes the destination address of the egress edge router of the primary LSP, the techniques of this disclosure enable a MP router to determine the FEC of the encapsulated packet received over the bypass LSP and, based on the determined FEC, determine the nexthop for the encapsulated packet along the primary LSP without need for MPLS primary labels associated with the primary LSP.

According to the disclosed techniques, routers may avoid tunneling traffic over a bypass LSP using a label stack that includes both LDP primary labels and bypass labels. Furthermore, according to the disclosed techniques, routers may avoid NNH label distribution over targeted LDP sessions and avoid using NNH LDP primary labels to transmit traffic over the bypass LSP. Avoiding NNH label distribution may reduce label state at both PLR routers and MP routers, and it may reduce or eliminate targeted LDP sessions between PLR routers and MP routers, which may improve scalability.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
    establishing, by a merge point (MP) router, a bypass label switched path (LSP) between a point of local repair (PLR) router and the MP router, wherein the PLR router and the MP router are included along a primary LSP established between an ingress edge router and an egress edge router;
    upon a failover from the primary LSP to the bypass LSP, receiving, by the MP router via the bypass LSP, a packet encapsulated with a generic routing encapsulation (GRE) header and a delivery header including a destination address of the egress edge router of the primary LSP;
    determining, by the MP router, a forwarding equivalence class (FEC) of the encapsulated packet based on the destination address of the egress edge router included in the delivery header of the encapsulated packet;
    pushing, by the MP router, a primary label for the determined FEC associated with the primary LSP onto the encapsulated packet, wherein pushing the primary label onto the encapsulated packet comprises determining, based on the determined FEC of the encapsulated packet, a primary nexthop having a primary label operation, and adding the primary label to the encapsulated packet according to the primary label operation of the primary nexthop; and
    forwarding the encapsulated packet along the primary LSP toward the egress edge router according to the primary label.

2. The method of claim 1, wherein determining the FEC of the encapsulated packet comprises performing, in a routing engine of the MP router, a lookup of the destination address of the egress edge router included in the delivery header.

3. The method of claim 1, wherein receiving the encapsulated packet comprises receiving the encapsulated packet having an explicit-null bypass label.

4. The method of claim 3, wherein pushing the primary label onto the encapsulated packet comprises:
removing the explicit-null bypass label from the encapsulated packet prior to adding the primary label to the encapsulated packet.

5. A method comprising:
establishing, by a merge point (MP) router, a bypass label switched path (LSP) between a point of local repair (PLR) router and the MP router, wherein the PLR router and the MP router are included along a primary LSP established between an ingress edge router and an egress edge router:
prior to a failover from the primary LSP to the bypass LSP, receiving, by the MP router via the primary LSP, a first packet encapsulated with a generic routing encapsulation (GRE) header and a delivery header including a destination address of the egress edge router of the primary LSP, the first encapsulated packet having a first primary label associated with the primary LSP, swapping, by the MP router, the first primary label of the first encapsulated packet with a second primary label associated with the primary LSP, and forwarding the first encapsulated packet along the primary LSP toward the egress edge router according to the second primary label; and
upon the failover from the primary LSP to the bypass LSP, receiving, by the MP router via the bypass LSP, a second packet encapsulated with the GRE header and the delivery header including the destination address of the egress edge router of the primary LSP, determining, by the MP router, a forwarding equivalence class (FEC) of the second encapsulated packet based on the destination address of the egress edge router included in the delivery header of the second encapsulated packet, pushing, by the MP router, the second primary label for the determined FEC associated with the primary LSP onto the second encapsulated packet, and forwarding the second encapsulated packet along the primary LSP toward the egress edge router according to the second primary label.

6. A router configured to operate as a merge point (MP) router, the router comprising:
a control unit comprising one or more processors configured to:
establish a bypass label switched path (LSP) between a point of local repair (PLR) router and the MP router, wherein the PLR router and the MP router are included along a primary LSP established between an ingress edge router and an egress edge router,
upon a failover from the primary LSP to the bypass LSP, receive, via the bypass LSP, a packet encapsulated with a generic routing encapsulation (GRE) header and a delivery header including a destination address of the egress edge router of the primary LSP, determine a forwarding equivalence class (FEC) of the encapsulated packet based on the destination address of the egress edge router included in the delivery header of the encapsulated packet, and
push a primary label for the determined FEC associated with the primary LSP onto the encapsulated packet, wherein the one or more processors are configured to determine, based on the determined FEC of the encapsulated packet, a primary nexthop having a primary label operation, and add the primary label to the encapsulated packet according to the primary label operation of the primary nexthop; and
one or more packet interfaces configured to forward the encapsulated packet along the primary LSP toward the egress edge router according to the primary label.

7. The router of claim 6, wherein the control unit is configured to perform a lookup of the destination address of the egress edge router included in the delivery header to determine the FEC of the encapsulated packet.

8. The router of claim 6, wherein the control unit receives the encapsulated packet having an explicit-null bypass label.

9. The router of claim 8, wherein the control unit is configured to:
remove the explicit-null bypass label from the encapsulated packet prior to adding the primary label to the encapsulated packet.

10. A router configured to operate as a merge point (MP) router, the router comprising:
a control unit comprising one or more processors configured to:
establish a bypass label switched path (LSP) between a point of local repair (PLR) router and the MP router, wherein the PLR router and the MP router are included along a primary LSP established between an ingress edge router and an egress edge router,
prior to a failover from the primary LSP to the bypass LSP, receive, via the primary LSP, a first packet encapsulated with a generic routing encapsulation (GRE) header and a delivery header including a destination address of the egress edge router of the primary LSP, the first encapsulated packet having a first primary label associated with the primary LSP, and swap the first primary label of the first encapsulated packet with a second primary label associated with the primary LSP, and
upon the failover from the primary LSP to the bypass LSP, receive, via the bypass LSP, a second packet encapsulated with the GRE header and the delivery header including the destination address of the egress edge router of the primary LSP, determine a forwarding equivalence class (FEC) of the second encapsulated packet based on the destination address of the egress edge router included in the delivery header of the second encapsulated packet, and push the second primary label for the determined FEC associated with the primary LSP onto the second encapsulated packet; and
one or more packet interfaces configured to forward the first encapsulated packet and the second encapsulated packet along the primary LSP toward the egress edge router according to the second primary label.

11. A method comprising:
establishing, by a point of local repair (PLR) router, a bypass label switched path (LSP) between a PLR router and a merge point (MP) router, wherein the PLR router and the MP router are included along a primary LSP established between an ingress edge router and an egress edge router;
receiving, by the PLR router, a packet encapsulated with a generic routing encapsulation (GRE) header and a delivery header including a destination address of the egress edge router of the primary LSP, the encapsulated packet having a primary label associated with the primary LSP;

upon a failover from the primary LSP to the bypass LSP, swapping, by the PLR router, the primary label of the encapsulated packet with a bypass label associated with the bypass LSP, wherein swapping the primary label with the bypass label comprises determining, based on the primary label of the encapsulated packet, a backup nexthop having a swap bypass label operation, removing the primary label from the encapsulated packet according to the swap bypass label operation of the backup nexthop, and adding the bypass label to the encapsulated packet according to the swap bypass label operation of the backup nexthop; and forwarding the encapsulated packet along the bypass LSP toward the MP router according to the bypass label.

12. A method comprising:

establishing, by a point of local repair (PLR) router, a bypass label switched path (LSP) between a PLR router and a merge point (MP) router, wherein the PLR router and the MP router are included along a primary LSP established between an ingress edge router and an egress edge router;

prior to a failover from the primary LSP to the bypass LSP, receiving, by the PLR router, a first packet encapsulated with a generic routing encapsulation (GRE) header and a delivery header including a destination address of the egress edge router of the primary LSP, the first encapsulated packet having a first primary label associated with the primary LSP, and swapping, by the PLR router, the first primary label of the first encapsulated packet with a second primary label associated with the primary LSP, and forwarding the first encapsulated packet along the primary LSP toward the egress edge router according to the second primary label; and upon the failover from the primary LSP to the bypass LSP, receiving, by the PLR router, a second packet encapsulated with the GRE header and the delivery header including the destination address of the egress edge router of the primary LSP, the second encapsulated packet having the first primary label associated with the primary LSP, swapping, by the PLR router, the first primary label of the second encapsulated packet with a bypass label associated with the bypass LSP, and forwarding the second encapsulated packet along the bypass LSP toward the MP router according to the bypass label.

13. A router configured to operate as a point of local repair (PLR) router, the router comprising:

a control unit comprising one or more processors configured to:

establish a bypass label switched path (LSP) between a PLR router and a merge point (MP) router, wherein the PLR router and the MP router are included along a primary LSP established between an ingress edge router and an egress edge router, receive a packet encapsulated with a generic routing encapsulation (GRE) header and a delivery header including a destination address of the egress edge router of the primary LSP, the encapsulated packet having a primary label associated with the primary LSP, and upon a failover from the primary LSP to the bypass LSP, swap the primary label of the encapsulated packet with a bypass label associated with the bypass LSP, wherein the one or more processors are configured to determine, based on the primary label of the encapsulated packet, a backup nexthop having a swap bypass label operation, remove the primary label from the encapsulated packet according to the swap bypass label operation of the backup nexthop, and add the bypass label to the encapsulated packet according to the swap bypass label operation of the backup nexthop; and one or more packet interfaces configured to forward the encapsulated packet along the bypass LSP toward the MP router according to the bypass label.

14. A router configured to operate as a point of local repair (PLR) router, the router comprising:

a control unit comprising one or more processors configured to:

establish a bypass label switched path (LSP) between a PLR router and a merge point (MP) router, wherein the PLR router and the MP router are included along a primary LSP established between an ingress edge router and an egress edge router, prior to a failover from the primary LSP to the bypass LSP, receive a first packet encapsulated with a generic routing encapsulation (GRE) header and a delivery header including a destination address of the egress edge router of the primary LSP, the first encapsulated packet having a first primary label associated with the primary LSP, and swap the first primary label of the first encapsulated packet with a second primary label associated with the primary LSP and upon the failover from the primary LSP to the bypass LSP, receive a second packet encapsulated with the GRE header and the delivery header including the destination address of the egress edge router of the primary LSP, the second encapsulated packet having the first primary label associated with the primary LSP, swap the first primary label of the second encapsulated packet with a bypass label associated with the bypass LSP; and one or more packet interfaces configured to forward the first encapsulated packet along the primary LSP toward the MP router according to the second primary label, and forward the second encapsulated packet along the bypass LSP toward the MP router according to the bypass label.

15. A system comprising:

an ingress edge router of a primary label switched path (LSP) established between the ingress edge router and an egress edge router, the ingress edge router configured to encapsulate a packet with a generic routing encapsulation (GRE) header and a delivery header including a destination address of the egress edge router, and push a first primary label associated with the primary LSP onto the encapsulated packet;

a point of local repair (PLR) router configured to establish a bypass LSP between the PLR router and a merge point (MP) router, wherein the PLR router and the MP router are included along the primary LSP, receive the encapsulated packet having the first primary label, upon a failover from the primary LSP to the bypass LSP, swap the first primary label of the encapsulated packet with a bypass label associated with the bypass LSP, and forward the encapsulated packet having the bypass label along the bypass LSP toward the MP router;

the MP router configured to, during the failover from the primary LSP to the bypass LSP, receive, via the bypass LSP, the encapsulated packet, determine a forwarding equivalence class (FEC) of the encapsulated packet based on the destination address of the egress edge router included in the delivery header of the encapsulated packet, push a second primary label for the determined FEC associated with the primary LSP onto the encapsulated packet, and forward the encapsulated packet having the second primary label along the primary LSP toward the egress edge router; and the egress edge router of the primary LSP, the egress edge router configured to receive the encapsulated packet having the second primary label, remove the second primary label, the delivery header, and the GRE header from the packet, and forward the packet to a receiver.

* * * * *